…

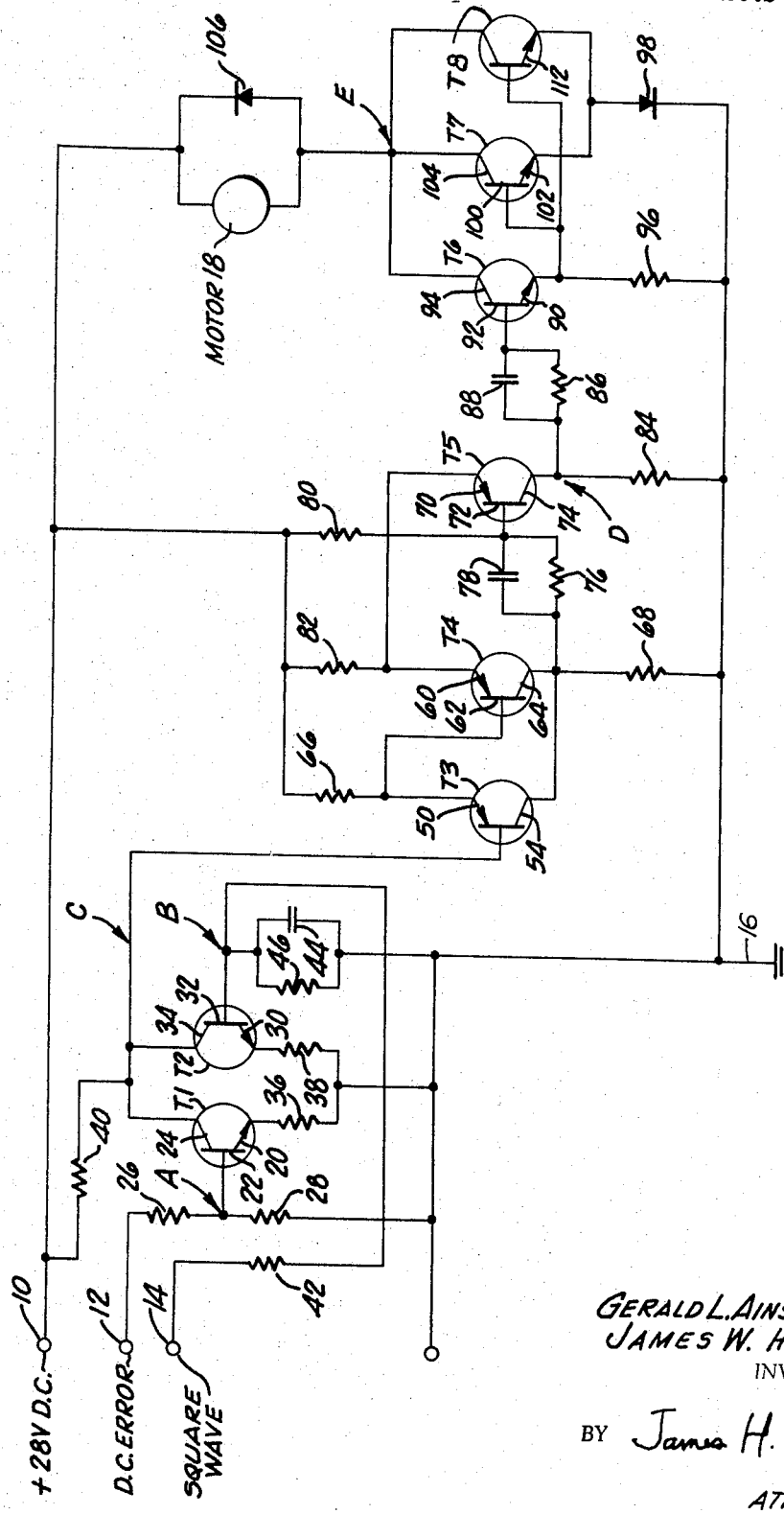

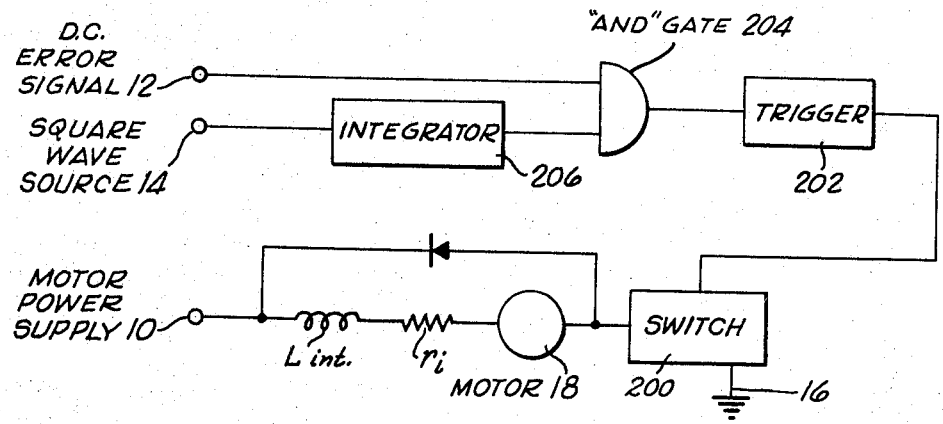
FIG_2
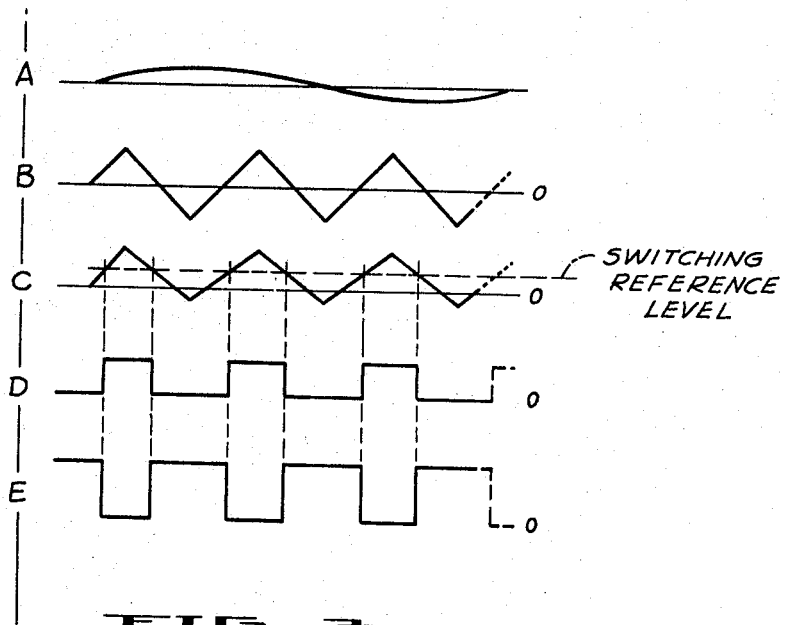
FIG_3

United States Patent Office 3,354,371
Patented Nov. 21, 1967

3,354,371
PULSE WIDTH MODULATOR
Gerald L. Ainsworth, Palo Alto, and James W. Hebb, Mountain View, Calif., assignor to Ampex Corporation, Redwood City, Calif., a corporation of California
Filed Feb. 12, 1964, Ser. No. 344,375
4 Claims. (Cl. 318—341)

This application relates to control circuitry for electric motors in magnetic tape recorders and the like and also to a type of pulse width modulating circuit suitable for use therein.

In the past, many magnetic tape transport servo motors have been electric and have been powered through an emitter-follower transistor having the power supply directly coupled to its collector, the control signal applied through an amplifier to its base, and the servo motor coupled to its emitter. Feedback returned to the control signal amplifier was usually either the voltage at the transistor emitter or a representative part of the current emerging from the motor.

The worst disadvantage of the emitter-follower control system is the great power dissipation and correlative head build-up in the transistor. This is highly detrimental in airborne tape recorders, since large power consumption necessitates larger power supplies and control system components, thus enlarging the weight and bulk of the system. Moreover, especially in sealed and temperature-controlled applications, the emitter-follower transistor heat build-up is intolerable.

It is, therefore, a general object of this invention to provide an improved motor control system.

Another object of this invention is to provide a motor control system with minimum power dissipation.

Another object of this invention is to provide a motor control system of minimal bulk, weight, and complexity.

Another object of this invention is to provide a pulse width modulator of improved accuracy and precision.

In the achievement of the above objects and as a feature of Applicants' invention, the direct current (herein denoted DC) error voltage which constitutes one input to the control circuit has added to it a triangular waveform. The sum of the DC and triangular signals is then passed through a trigger circuit, which produces a pulse width modulated signal in response thereto. The pulse width modulated signal is used to switch on and off the power supply to the servo motor. Since no current passes through the "open" switch, and since there is little voltage drop across the "closed" switch, the power dissipation across the switch, either "open" or "closed," is almost nil. Thus, the power demands of the motor control system are limited mainly to the demands of the servo motor itself, and the entire motor drive system can be scaled down to meet this lessened demand.

Another feature of Applicant's invention is the pulse width modulator which produces the switching signal applied to the motor. The modulator integrates a square wave supplied to the circuit to produce a regular triangular waveform. This triangular waveform is added to the DC error signal by which the above mentioned servo-motor is to be controlled. The triangular modulated error signal is then applied to a trigger circuit which switches alternately from "on" to "off" or from "off" to "on" whenever the triangular waveforms cross a prearranged reference level. The alternate switchings of the trigger circuit result in an output waveform composed of pulses of duration proportional to the DC error voltage pulses, since it is the DC error voltage added to the otherwise regular triangular waves that create irregularity in the timing of the reference level crossings of the triangular waves.

In short, Applicants' invention is directed to a simple pulse width modulator, the pulse width of which is linear with applied DC error voltage, to control a saturating switch which in turn is used to control the average power to a DC motor or other prime mover. If the frequency of modulation is high enough, the power applied to the motor will be proportional to the DC error voltage, making the system act in a linear manner without the normal losses found in a conventional linear system.

Other objects and features of this invention and a fuller understanding thereof may be had by referring to the following description and claims taken in conjunction with the accompanying drawings, in which:

FIGURE 1 is a schematic diagram of a circuit comprising a preferred embodiment of Applicant's invention;

FIGURE 2 is a block diagram of the system set forth schematically in FIGURE 1; and FIGURE 3 illustrates the waveforms at various points in the circuit of FIGURE 1.

Referring to FIGURE 1, a preferred embodiment of Applicants' invention has a power supply terminal 10, a DC error signal input terminal 12, a square wave input terminal 14, and a ground terminal 16. The purpose of the circiut herein described is to control the speed of operation of a motor 18. The power supply 10 is specified for purposes of illustration as being +28 volts DC.

Two transistors T1, T2 having emitters 20, 30, bases 22, 32, and collectors 24, 34, respectively, serve to add the DC error signal arriving at the point A and the triangualr waveforms appearing at the point B. The DC error terminal 12 is coupled to the base 22 of the transistor T1 through a resistor 26, and a resistor 28 is connected between the base 22 and ground 16. The emitters 20, 30 of the transistors T1, T2 are joined together through resistors 36, 38 and are thereafter coupled to ground 16. The collectors 24, 34 of the transistors T1, T2 are directly joined and are coupled to the power supply 10 through a resistor 40.

The square wave signal source 14 is coupled through a resistor 42 to a R-C integrating circuit comprising a capacitor 44 and a resistor 46 coupled in parallel between the base 32 of the transistor T2 and ground. A transistor T3 having emitter 50, base 52, and collector 54 has its base 52 directly coupled to the joined collectors 24, 34.

A trigger circuit is constructed around two transistors T4, T5, which have emitters 60, 70, bases 62, 72, and collectors 64, 74, respectively. The base 62 of the transistor T4 is directly coupled to the emitter 50 of the transistor T3 and is coupled to the power supply 10 through a resistor 66. The collector 64 of the transistor T4 is coupled to ground through a resistor 68.

The base 72 of the transistor T5 is coupled to the collector 54 of the transistor T3 through a resistor 76 and a capacitor 78 in parallel and is also coupled to the power supply 10 throuhg a resistor 80. The emitters 60, 70 of the transistors T4, T5 are coupled to the power supply 10 through a resistor 82. The collector 74 of the transistor T5, coupled through a resistor 84 to ground 16, provides the output signal of the trigger circuit.

The trigger output is coupled from the collector 74 of the transistor T5 through a resistor 86 and a capacitor 88 to a transistor T6 having emitter 90, base 92, and collector 94, the base 92 being coupled to the parallel resistor 86 and capacitor 88. The emitter 90 of the transistor T6 is coupled through a resistor 96 to ground 16 and is directly coupled to bases 100, 110, respectively, of two transistors T7, T8. Emitters 102, 112 of the transistors T7, T8 are directly joined and are coupled to ground 16 through a diode 98. The collector 94 of the transistor T6 is directly joined to collectors 104, 114 of the transistors T7, T8. The three joined emitters 94, 104, 114 are coupled to the motor 18 and to a diode 106 in parallel therewith. The other end of the motor 18-diode 106 parallel combination is directly coupled to the power supply 10.

FIGURE 2 shows in block form the circuit described above and illustrated schematically in FIGURE 1. Thus, it can be seen that the current path between the power supply 10 and ground 16, running through the motor 18, is interrupted by a switch 200. The waveforms across the switch are determined by the output of the trigger 202 described above. The trigger is switched from one output voltage level to another by a waveform (FIGURE 3C) which is the summation from the And Gate 204 of the DC error signal supplied to the circuit (FIGURE 3A) and a regular triangular waveform (FIGURE 3B) created by integrating (at 206) a precisely regulated square wave. If the switching frequency of the switch 200 is sufficiently high, the current through the motor 18 will be maintained relatively constant by the effect of the diode 106 and the motor's own internal inductance, $L_{int}$.

In the operation of the circuit shown schematically in FIGURE 1 and described above, a DC error voltage is fed in at the terminal 12 and results in the appearance of the waveform A (FIGURE 3) at the base 24 of the transistor T1. A well-regulated square wave is supplied at the terminal 14 and is integrated by the capacitor 44, producing the triangular waveform at B (FIGURE 3), which is applied to the base 32 of the transistor T2. The transistors T1 and T2 and their associated circuitry then produce the summation waveform C (FIGURE 3) at collectors 24, 34.

Waveform C is fed directly into the high impedance emitter-follower transistor T3, the output of which (at the emitter 50) is applied to the base 62 of the transistor T4. The transistors T4 and T5, with their emitters 60, 70 directly coupled and with the output of T4 fed through the parallel resistor 76 and capacitor 78 to the input electrode 72 of T5, form a trigger circuit which responds to waveform C by producing the pulses D (FIGURE 3) at the output electrode 74 of the transistor T5. The transistors T4 and T5 being of the P-N-P conductivity type in the circuit here shown, they will be nonconductive when their bases 62, 72 are at a voltage level above or equal to that of their emitters 60, 70; they will conduct when their bases become negative of their emitters. The resistors 80, 76, and 68 form a voltage divider which keeps the base 72 at a voltage very near that of the emitter 70. The emitters 60, 70 are maintained at the reference voltage of the trigger, a voltage intermediate between the power supply voltage and ground, mainly by the resistor 82. When the waveform C is applied through the emitter-follower T3 to the base 62, as its voltage goes below the voltage of the emitter 60, transistor T4 becomes conductive and the voltage on its collector 64 rises, causing a rise in the voltage of the base 72 of the transistor T5. The value of the resistors 68 and 82 is such that when the transistor T4 is conducting the voltage at its emitter and thus, of course, at the joined emitter 70, drops by a large amount. Thus, the result of a negative going voltage which takes the base 62 of the transistor T4 below the T4 emitter voltage is a simultaneous drop in T5 emitter voltage and rise in T5 base voltage. Since the emitter and base voltages of the transistor T5 were fairly close to each other before, the simultaneous change of the two snaps the transistor into the cut-off state. The voltage at its collector 74, from which the output of the trigger is taken, would then be very near ground.

When the voltage at the base 62 of the transistor T4 goes positive of the emitter 60, the transistor T4 switches to the nonconductive state, the voltage at the emitter 60 rises, and the voltage at the collector 64 drops. The effect of these changes on the transistor T5 is simultaneously to raise the voltage of the emitter 70 by a substantial amount and to lower the voltage of the base 72, instantaneously switching the transistor T5 to the conductive state. When the transistor T5 is conducting, the voltage at its collector 74 rises almost to the level of the emitter 70.

The signals at the collector 74 of the transistor T5 are coupled through the parallel resistor 86 and speed-up capacitor 88 to the transistors T6, T7, and T8, the collectors of which exhibit the voltage shown at FIGURE 3E. When the transistor T5 is conducting and its collector 74 is at a relatively high voltage, the three transistors T6, T7, and T8, being N-P-N transistors, will be made highly conductive, and current will flow from the power supply 10 through the motor 18. When the transistor T5 is cut off, the transistors T6, T7, and T8 cease to conduct; the current then flowing in the motor armature is that maintained by the motor internal inductance and passed by the diode 106. If the frequency of the square wave applied at the terminal 14 and the resultant frequency of switching of the transistor T5 and T6, T7, and T8 on-off frequencies are high enough, the motor internal inductance will keep the current flow through the motor essentially constant throughout operation.

A motor control system in accordance with the above description and drawing was built and operated using the following components:

Voltages:
   10—+28 v. DC

Transistors:

| T1—2N1613 | T5—2N1132 |
|---|---|
| T2—2N1613 | T6—TA6200 |
| T3—2N1132 | T7—TA6200 |
| T4—2N1132 | T8—TA6200 |

Diodes:

| 98—TK21 | 106—TK21 |
|---|---|

Resistors (Ohms):

| 26—1430 | 68—100 |
|---|---|
| 28—2150 | 76—2000 |
| 36—1620 | 80—1500 |
| 38—1330 | 82—360 |
| 40—6810 | 84—620 |
| 42—7.5K | 86—620 |
| 66—6200 | 96—1000 |

Capacitors (Microfarads):

| 44—.1 | 88—.022 |
|---|---|
| 78—10047 | |

The circuit as defined above was operated with DC error voltages appearing at the terminal 12 varying between 0 and +5.5 v. and square waves at the terminal 14 of frequency 3.82 kc. Waveform D had an amplitude of +6 v., and waveform E, +28 v.

Thus, applicant has provided a servo motor control system wherein a pulse width modulated signal is used to switch the power supply to the motor on and off. It is apparent that no current passes through the "open" switch, i.e. through the transistors T6, T7, and T8 in their cut-off condition. On the other hand, even when these three transistors are in their conductive condition corresponding to "closed" switch, the small voltage drop across them ensures that little power will be consumed. Thus, throughout the operation of Applicants' new switching system, there is little dissipation of power in the switching components in comparison to the amount of power controlled in the motor.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A control system for regulating the supply of power to an electric motor in response to a DC error signal, comprising: a source of closely regulated square waves, an integrating capacitor coupled between the square wave source and ground, a first transistor having emitter, base, and collector, the base being coupled to the integrating capacitor, a second transistor having emitter, base, and collector, the base of the second transistor being coupled to receive the DC error signal, the collector of the second transistor being directly coupled to the collector of the first transistor, a third transistor having emitter, base, and collector, the base of the third transistor being coupled to the joined collectors of the first and second transistors, a fourth transistor having emitter, base, and collector, the base of the fourth transistor being coupled to the emitter of the third transistor, a fifth transistor having emitter, base, and collector, the emitter of the fifth transistor being directly joined to the emitter of the fourth transistor, the base of the fifth transistor being coupled directly to the collector of the fourth transistor, a sixth transistor having emitter, base, and collector, said sixth transistor connected in common collector configuration, the base of the sixth transistor being coupled to the collector of said fifth transistor, seventh and eighth transistors each having emitter, base, and collector, said bases of said seventh and eighth transistors connected to the emitter of said sixth transistor, said collectors of said seventh and eighth transistors connected to the collector of said sixth transistors, a diode coupling the emitters of said seventh and eighth transistors to ground, a power supply, said electric motor series connected between said power supply and the collectors of said sixth, seventh, and eighth transistors, and a diode in parallel with the electric motor.

2. A motor control system for regulating the supply of power to a motor in response to a DC error signal comprising a power supply, first, second, and third transistors each having emitter, base, and collector, said emitter of said first transistor connected to the bases of said second and third transistors, means coupling the emitters of said first, second, and third transistors to ground, means connecting said motor serially between said power supply and the collectors of said first, second, and third transistors, means for producing pulses having widths proportional to the amplitude of said error signal, and means applying said pulses to the base of said first transistor to render said first, second, and third transistors conducting for the durations of said pulses.

3. A motor control system according to claim 2, further defined by a diode connected in parallel with said motor.

4. A motor control system according to claim 2, further defined by said means for producing pulses comprising a source of triangular waveforms, means for adding the triangular waveforms to the error signal to produce a summation waveform, and means for switching from one voltage level to another voltage level whenever the summation waveform crosses a predetermined reference level to thereby produce said pulses having widths proportional to the amplitude of said error signal.

References Cited

UNITED STATES PATENTS

| | | | |
|---|---|---|---|
| 2,932,778 | 4/1960 | Curtis | 318—314 |
| 2,951,212 | 8/1960 | Schmid. | |
| 3,170,125 | 2/1965 | Thompson. | |
| 3,206,665 | 9/1965 | Burlingham | 318—314 X |

ORIS L. RADER *Primary Examiner.*

J. C. BERENZWEIG, J. J. BAKER,
*Assistant Examiners.*